United States Patent [19]

Schönauer

[11] Patent Number: 5,779,387
[45] Date of Patent: Jul. 14, 1998

[54] DEVICE FOR SUPPORTING OR CLAMPING AT LEAST ONE ARTICLE, SPECIFICALLY AN ELONGATE MEMBER

[76] Inventor: Paul Schönauer, Fahrweidstrasse 42, CH-8951 Fahrweid, Switzerland

[21] Appl. No.: 742,988

[22] Filed: Nov. 1, 1996

[30] Foreign Application Priority Data

Nov. 10, 1995 [DE] Germany ............... 295 17 872 U

[51] Int. Cl.$^6$ ........................................... F16L 3/10
[52] U.S. Cl. ................. 403/400; 403/396; 403/384; 403/334
[58] Field of Search .................. 403/400, 396, 403/394, 389, 384, 334; 285/334.2, 398, 408, 309, 371, 365

[56] References Cited

U.S. PATENT DOCUMENTS

| D. 140,617 | 3/1945 | Rocic | 285/365 X |
| 1,360,005 | 11/1920 | Moore | 285/365 X |
| 1,966,231 | 7/1934 | Andrus | 285/371 X |
| 2,014,634 | 9/1935 | Polgov | 403/400 X |
| 3,595,556 | 7/1971 | Schonauer . | |
| 5,259,690 | 11/1993 | Legge | 403/400 X |

FOREIGN PATENT DOCUMENTS

| 394 250B | 2/1992 | Austria . | |
| 0 062 2 78 | 3/1982 | European Pat. Off. . | |
| 580775 | 7/1933 | Germany | 285/371 |
| 1291297 | 7/1969 | Germany . | |
| 3708864 A1 | 9/1988 | Germany . | |
| 269995 | 5/1927 | United Kingdom | 403/400 |

*Primary Examiner*—Anthony Knight
*Attorney, Agent, or Firm*—Olson & Hierl, Ltd.

[57] ABSTRACT

The base body consisting e.g. of a metal, includes at least one double tapering through hole due to e.g. a casting operation. This through hole will not be worked in a cutting manner. A cladding is used for the through hole in shape of a sleeve consisting of an elastomeric material, which sleeve has a double tapering outer surface, which outer surface contacts the inner surface of the through hole. The sleeve has a cylinder shaped inner surface and is adapted for receipt of a cylinder shaped pipe. The through hole and the pipe must not be worked in a cutting manner and a safe clamping of the pipe over the entire length of the sleeve is ensured.

8 Claims, 1 Drawing Sheet

DEVICE FOR SUPPORTING OR CLAMPING AT LEAST ONE ARTICLE, SPECIFICALLY AN ELONGATE MEMBER

BACKGROUND OF THE INVENTION

1. Field of the Invention

The present invention relates to a device for supporting or clamping at least one article, specifically for supporting an elongate member in a movable manner or fixed in a clamped state such to allow an adjusting of the position of the elongate member relative to the supporting and clamping device, which device includes a base body in form of a casting.

Such devices are mainly used for supporting or clamping of pipes. The device can be applied for a clamping of e.g. a pipe in order to arrest such pipe or then for supporting a pipe in such a manner that it can be moved axially or rotated in the device whereby such movements of the pipe may be allowed to occur unhampered or then by a corresponding tightening of the device to produce some friction against movements of the pipe supported by the device.

2. Description of the Prior Art

Although such devices for supporting or clamping elongate articles lend themselves to be used in a large variety of techniques the present application is intended specifically for the use on a production or handling apparatus having suction cups such as disclosed in the DE-PS 1 291 297 and U.S. Pat. No. 3,595,556. Such apparatuses are also known by the expression work bench.

The work benches disclosed in mentioned documents can also be called suction clamping apparatuses. The known devices for supporting or clamping of at least one article as disclosed in mentioned work benches have been proven to be useful in the practical application. The success of the above mentioned work benches depends for a large extend from the fact that the supporting or clamping devices used on this work benches are reliable in operation and that such a work bench can be produced at very low costs. The base body of such supporting or clamping device consists generally of a casting which includes a machined bore for the receipt of a pipe. Additionally, a sleeve consisting of e.g. copper, brass or bronze may be inserted in such bore hole. Furthermore, a given pipe must be worked at its surface in a cutting manner by a turning on a lathe or by a grinding, such that always fitting areas contact each other between the base body of the supporting or clamping device and the sleeve and also between the sleeve and the pipe, as well. This expensive producing of such a device is necessary in order to have an impeccable supporting of the clamped pipe, also in case of large loads.

SUMMARY OF THE INVENTION

Hence it is a general object of the present invention to provide a device for supporting or clamping at least one article, which is easier to operate and cheaper to manufacture and at the same time supports a pipe impeccably also in case of large loads.

Another object of the invention aims at the provision of a device for supporting or clamping at least one article, specifically for supporting an elongate member, which device includes at least one first through hole adapted for receipt of a pipe, which at least one first through hole features a double taper tapering in opposite directions, including further at least one cladding in form of a sleeve made of an elastomeric material, whereby each first through hole includes such a sleeve, which sleeves include a second through hole adapted to receive such elongate member.

BRIEF DESCRIPTION OF THE DRAWINGS

The invention will be better understood and objects other than those set fourth above will become apparent when consideration is given to the following detailed description thereof. Such description makes reference to the annexed drawing, wherein.

DETAILED DESCRIPTION OF THE PREFERRED EMBODIMENT

Figure 1:
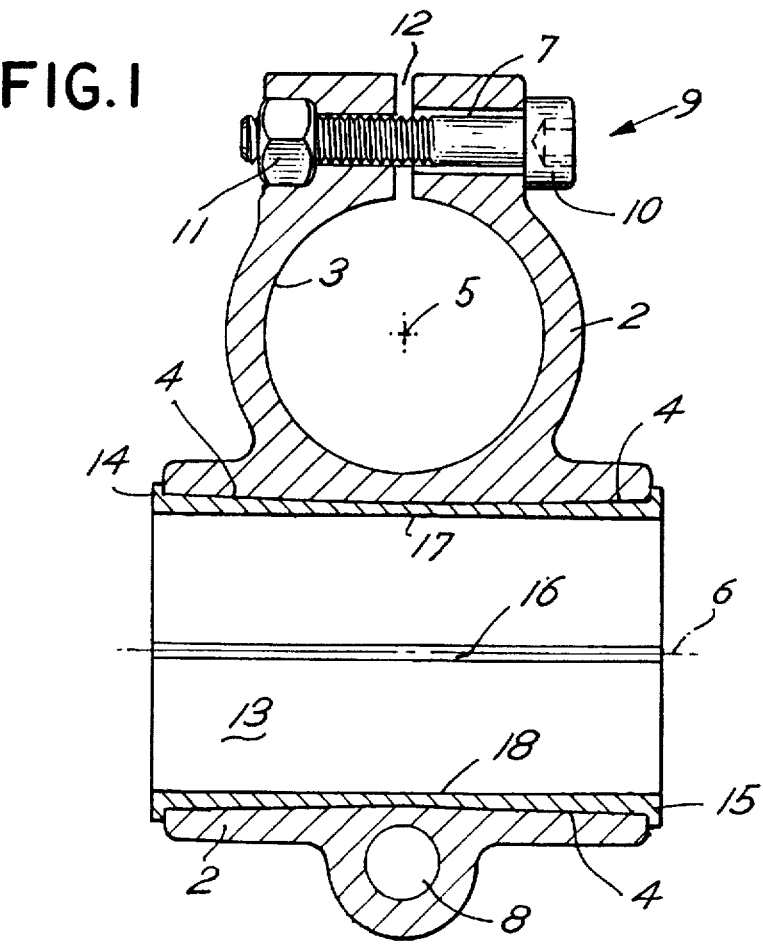
FIG. 1 illustrates in section a supporting or clamping device having a sleeve as inner cladding.
Figure 2:
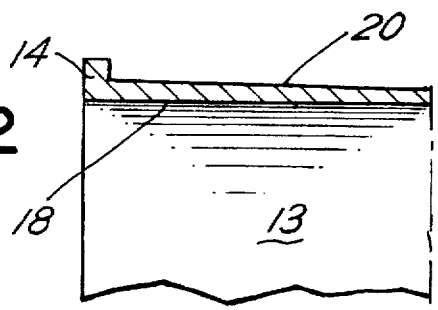
FIG. 2 illustrates on an enlarged scale a section of the sleeve.
Figure 3:
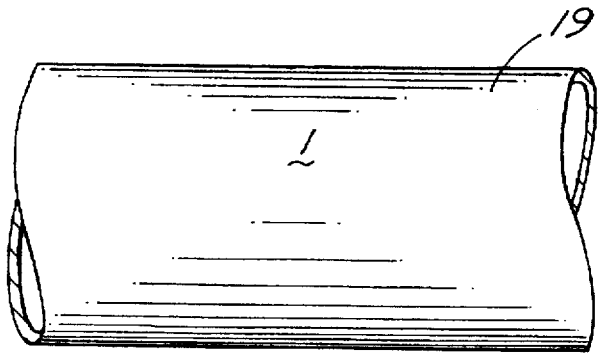
FIG. 3 is a view of a pipe for the supporting or clamping device of FIG. 1.

The clamping or supporting device illustrated in FIG. 1 is designed as a cross supporting or clamping device which also could be termed cross sleeve. This device is intended for the receipt of two pipes, whereby only pipe 1 is illustrated. The base body 2 of this clamping or supporting device is a casting and consists in general of a metal. The base body 2 includes two first through holes 3 and 4, which extend rectangularly relative to each other. The first through hole 3 has an axis 5 and the first through hole 4 has an axis 6. The base body 2 has through bores 7 and 8, each adapted for the receipt of a clamping device 9. The clamping device 9 of the illustrated embodiment is designed as a screw bolt type clamp and includes a threaded bolt 10, whereby the corresponding nut 11 is embedded in the base body 2. The width of the longitudinal slot 12 in the base body 2 is adjustable by means of this clamping device 9. The clamping device present in the through bore 8 is not particularly illustrated.

Because the base body 2 is a cast object, which has been produced e.g. by a injection moulding method the first through holes 3 and 4 have after their production a double taper tapering in opposite directions. This double taper is due to the taper needed when opening the mould such that the moulding tools, coming from two sides can be retreived after the casting out of the first through holes. Also in such cases where the base body 2 is cast by a different method, the first through holes produced accordingly are never precisely of a cylindrical shape and it always has been necessary to machine them by a cutting operation, that is they had to be turned out. According to the invention, however, the first through holes 3 and 4 remain with their double taper.

These first through holes 3 and 4 which now have not been machined by a cutting operation are provided with a cladding made of an elastomeric material. This cladding is a sleeve 13 which includes at both its ends a flange 14 and 15, respectively. The flanges 14 and 15 contact both free end surfaces of the first through hole 4. In order to allow a simple inserting of the sleeve 13 into the first through hole 4 the sleeve 13 includes a longitudinal slot 16. The first through hole 3 illustrated in FIG. 1 is designed without an inserted sleeve.

The sleeve 13 consisting of an elastomeric material can consist e.g. of a thermoplastic material and is produced by an injection moulding. By means of this sleeve 13 the double taper tapering in opposite directions of the first through hole 4 is compensated, because the thickness of the wall of the sleeve 13 changes continuously along its longitudinal extent.

Thus, the wall thickness of the sleeve 13 amounts at the location or apex 17 to e.g. 0.8 mm and features adjacent the flange 14 or 15, respectively a wall thickness of 0.2 mm. The location 17 is located halfway along the length of the sleeve 13. The sleeve 13 has a second through hole 8 in the shape of a circular cylinder, which through hole 8 is adapted to receive the pipe 1. The surface 18 of the pipe is not machined; therefore, a commodity generally available in the market is used without a need of a additional cutting or grinding operation.

Thus, the base body 2 of the supporting or clamping device features after the casting operation a double tapered through hole 4 and the sleeve 13 has an accordingly double tapering outer surface 20 and these double tapering surfaces about each other leading to an inner surface 18 having the shape of a circular cylinder for the pipe 1 which is not machined at its outer surface.

Instead of the design of the clamping device 9 as including a screw bold type clamp with a threaded bolt 10 and a nut 11, this clamping device can also be designed as a not specifically illustrated eccentric clamp.

Instead of the illustrated cross supporting or clamping device (cross-sleeve) it is also possible to have a single supporting or clamping device which, therefore is adapted for supporting only one pipe.

At the embodiment of the supporting or clamping, respectively device according to FIG. 1 it is ensured that a necessary transmission of force between the clamping device and the pipe occurs over the entire surface 18 and acts accordingly via surface contact and this without a cutting working at the first through hole 4, furthermore without a cutting working of the sleeve located therein and, still furthermore without an additional working of the outer surface 19 of the pipe 1. Such a clamping or supporting, resp. device can be used to allow the pipe 1 supported therein to be displaced in the longitudinal direction of the device, that is for allowing a moving of the pipe in the device. The supporting or clamping, resp. device can, however, be also used to support a pipe 1 to rotate therein, either in order to rotate the pipe 1 in the supporting or clamping, resp. device into a desired rotational position and thereafter for clamping the pipe 1 in this position, or then for a continuously rotating support in which case the clamping device is tightened only that much that the pipe 1 can still rotate in the base body 2. Thus, this supporting or clamping, respectively device can be used as a support for a longitudinal movement of a pipe or for a rotational movement of the pipe, whereby any given position of the base body 2, relative to the pipe 1 may be arrested by a clamping.

Such a device for supporting or clamping, resp. an elongate article can be produced at quite low costs and features hardly any, wear after a use over many years. If really needed, the sleeve 13 consisting of an elastomeric material can obviously be exchanged against a different sleeve.

While there is shown and described at present preferred embodiment of the invention it is to be distinctly understood, that the invention is not limited thereto but may be otherwise variously embodied and practised within the scope of the following claims.

I claim:

1. A device for supporting or clamping at least one article, specifically for supporting an elongate member in a moveable manner or in a clamped state such as to allow an adjusting of the position of said elongate member relative to said supporting and clamping device, which device includes a base body in the form of a casting; comprising at least one first through hole adapted for receipt of a pipe, which at least one first through hole features a double taper tapering in opposite directions, comprising further at least one cladding in the form of a sleeve made of an elastomeric material, which sleeve includes a second through hole adapted to receive such elongate member, wherein the apex of the double tapering is proximate the middle of the first through hole, with the tapers widening toward the ends of the first through hole.

2. The device of claim 1, in which said sleeve comprises a longitudinally extending slot.

3. The device of claim 1, in which said sleeve comprises at both its ends a flange which flanges abut the base body at the respective exit areas of the first through holes.

4. The device of claim 1, in which each first through hole comprises a longitudinal slot, and the width of this slot is adjustable by means of a clamping device.

5. The device of claim 4, in which said clamping device comprises a screw clamp.

6. The device of claim 1, in which the device is designed as a cross sleeve having accordingly two first through holes extending perpendicularly to each other and adapted to receive two elongate members extending perpendicularly to each other.

7. The device of claim 1, in which each sleeve consists of a thermoplastic material.

8. The device of claim 1, wherein the double taper tapering in opposite directions is the taper present for the casting of the base body of the device by menas of two casting molds, in order to allow an extracting of the two casting molds out of the first through hole upon the opening of the mold.

* * * * *